(12) United States Patent
Bulpett et al.

(10) Patent No.: US 7,262,235 B2
(45) Date of Patent: Aug. 28, 2007

(54) URETHANE ELASTOMERS WITH IMPROVED COLOR STABILITY

(75) Inventors: David A. Bulpett, Boston, MA (US); Shenshen Wu, North Dartmouth, MA (US); Kevin M. Harris, New Bedford, MA (US); Manjari Kuntimaddi, New Bedford, MA (US); Mitchell E. Lutz, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 11/608,548

(22) Filed: Dec. 8, 2006

(65) Prior Publication Data

US 2007/0082990 A1 Apr. 12, 2007

Related U.S. Application Data

(63) Continuation of application No. 10/627,504, filed on Jul. 25, 2003, now Pat. No. 7,148,278, which is a continuation of application No. 09/861,909, filed on May 21, 2001, now abandoned.

(60) Provisional application No. 60/238,123, filed on Oct. 6, 2000.

(51) Int. Cl.
*A63B 37/12* (2006.01)
*C08K 5/3447* (2006.01)

(52) U.S. Cl. .................. 524/91; 524/100; 524/720; 473/378

(58) Field of Classification Search ............... None
See application file for complete search history.

(56) References Cited

U.S. PATENT DOCUMENTS

| | | |
|---|---|---|
| 3,147,324 A | 10/1960 | Ward |
| 3,989,568 A | 11/1976 | Isaac |
| 4,028,331 A | 6/1977 | Hotta et al. |
| 4,123,061 A | 10/1978 | Dusbiber |
| 4,721,744 A | 1/1988 | Ishii et al. |
| 4,925,888 A | 5/1990 | Aumueller et al. |
| 5,006,297 A | 4/1991 | Brown et al. |
| 5,156,405 A | 10/1992 | Kitaoh et al. |
| 5,334,673 A | 8/1994 | Wu |
| 5,494,291 A | 2/1996 | Kennedy |
| 5,688,191 A | 11/1997 | Cavallaro et al. |
| 5,692,974 A | 12/1997 | Wu et al. |
| 5,733,428 A | 3/1998 | Calabria et al. |
| 5,792,008 A | 8/1998 | Kakiuchi et al. |
| 5,800,286 A | 9/1998 | Kakiuchi et al. |
| 5,823,890 A | 10/1998 | Maruko et al. |
| 5,840,788 A | 11/1998 | Lutz et al. |
| 5,908,358 A * | 6/1999 | Wu .......................... 473/378 |
| 5,959,059 A | 9/1999 | Vedula et al. |
| 5,976,035 A | 11/1999 | Umezawa et al. |
| 5,993,968 A | 11/1999 | Umezawa et al. |
| 6,117,024 A | 9/2000 | Dewanjee |
| 6,123,628 A | 9/2000 | Ichikawa et al. |
| 6,287,080 B1 | 9/2001 | Evans |
| 6,719,646 B2 | 4/2004 | Calabria et al. |
| 6,793,864 B1 | 9/2004 | Dewanjee et al. |
| 6,831,147 B1 * | 12/2004 | Scholl et al. ............... 528/201 |

FOREIGN PATENT DOCUMENTS

WO    WO98/37929    9/1998

* cited by examiner

*Primary Examiner*—David J. Buttner
(74) *Attorney, Agent, or Firm*—William B. Lacy

(57) ABSTRACT

A golf ball comprising a center, an inner cover layer, and an outer cover layer, wherein the outer cover layer has a color lightness, L*, of 87 or greater following exposure to UV light at an irradiance power of 1.00 W/m²/nm for a period of about 1 hour to about 4 hours, and the cover comprises a polyurea formed from a prepolymer and a curing agent; and a blend of color stabilizers consisting of 2-(2H-Benzotriazol-2-yl)-4-methyl-6-dodecylphenol, 3-(2H-Benzotriazol-2-yl)-5-tert-butyl-4-hydroxybenzenepropanoic acid, and 2-[4-((2-Hydroxy-3-dodecyloxypropyl)oxy)-2-hydroxyphenyl]-4,6-bis(2,4-dimethylphenyl)-1,3,5-triazine; wherein each of the color stabilizers is present in an amount of 1.0 to 3.0 percent by weight.

19 Claims, No Drawings

URETHANE ELASTOMERS WITH IMPROVED COLOR STABILITY

CROSS-REFERENCE INVENTION

This application is a continuation of U.S. patent application Ser. No. 10/627,504, filed Jul. 25, 2003 now U.S. Pat. No. 7,148,278, which is a continuation of U.S. patent application Ser. No. 09/861,909 filed May 21, 2001 now abandoned which claimed priority to U.S. Provisional Patent Application Ser. No. 60/238,123, filed Oct. 6, 2000, the entire disclosure of which is incorporated by reference herein.

FIELD OF THE INVENTION

The invention relates generally to golf balls and, in one embodiment, to golf ball covers formed of a polyurethane composition. The polyurethane composition of the invention includes a pre-polymer, a curing agent, and a UV stabilizer package for improved color stability.

BACKGROUND OF THE INVENTION

Golf balls, whether of solid or wound construction, generally include a core and a cover. It is known in the art to modify the properties of a conventional solid ball by altering the typical single layer core and single cover layer construction to provide a ball having at least one mantle layer disposed between the cover and the core. The core may be solid or liquid-filled, and may be formed of a single layer or one or more layers. Covers, in addition to cores, may also be formed of one or more layers. These multi-layer cores and covers are sometimes known as "dual core" and "dual cover" golf balls, respectively. Additionally, many golf balls contain one or more intermediate layers that can be of solid construction or, in many cases, be formed of a tensioned elastomeric winding, which are referred to as wound balls. The difference in play characteristics resulting from these different types of constructions can be quite significant. The playing characteristics of multi-layer balls, such as "feel" and compression, can be tailored by varying the properties of one or more of these intermediate and/or cover layers.

Manufacturers generally provide the golf ball with a durable cover material, such as an ionomer resin, or a softer cover material, such as balata or polyurethane. Balata is a natural or synthetic trans-polyisoprene rubber that is a favored cover material for highly-skilled golfers because of its softness. Balata-covered balls, however, are easily damaged, and therefore lack the durability required by the recreational golfer.

Ionomer resins have in many situations replaced balata as a cover material. Chemically, ionomer resins are a copolymer of an olefin and an α,β-ethylenically-unsaturated carboxylic acid having 10-90% of the carboxylic acid groups neutralized by a metal ion and are distinguished by the type of metal ion, the amount of acid, and the degree of neutralization. Commercially available ionomer resins include copolymers of ethylene and methacrylic or acrylic acid neutralized with metal salts. Examples include SURLYN® from E.I. DuPont de Nemours and Co. of Wilmington, Del. and IOTEK® from Exxon Corporation of Houston, Tex.

Surrounding the core with an ionomeric cover material provides a ball that is virtually indestructible by golfers. The core/cover combination permits golfers to impart a high initial velocity to the ball that results in improved distance. Because the materials used to form solid golf balls are very rigid, however, solid balls generally have a hard "feel" when struck with a club.

A number of patents have been issued that are directed towards modifying the properties of layers used in forming wound balls, conventional solid balls, multi-layer balls having dual cover layers, dual core layers, and/or balls having a mantle layer disposed between the cover and the core. For example, U.S. Pat. No. 3,147,324 is directed to a method of making a golf ball having a polyurethane cover.

Polyurethanes are used in a wide variety of applications including adhesives, sealants, coatings, fibers, injection molding components, thermoplastic parts, elastomers, and both rigid and flexible foams. Polyurethane can be produced by the product of a reaction between a polyurethane prepolymer and a curing agent. The polyurethane prepolymer is generally a product formed by a reaction between a polyol and a diisocyanate. The curing agents used previously are typically diamines or glycols. A catalyst is often employed to promote the reaction between the curing agent and the polyurethane prepolymer.

Since about 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a fast-reacting diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol.

Additionally, U.S. Pat. No. 3,989,568 discloses a three-component system employing either one or two polyurethane prepolymers and one or two polyol or fast-reacting diamine curing agents. The reactants chosen for the system must have different rates of reactions within two or more competing reactions.

U.S. Pat. No. 5,692,974 discloses methods of using cationic ionomers in golf ball cover compositions. Additionally, the patent relates to golf balls having covers and/or cores incorporating urethane ionomers. Improved resiliency and initial velocity are achieved by the addition of an alkylating agent such as t-butyl-chloride, which induces ionic interactions in the polyurethane to produce cationic type ionomers.

International Patent Application WO 98/37929 discloses a composition for golf ball covers that comprises a blend of a diisocyanate/polyol prepolymer and a curing agent including a blend of a slow-reacting diamine and a fast-reacting diamine. Improved "feel," playability, and durability characteristics are exhibited.

One problem manufacturers have encountered with many polyurethane compositions is the tendency of these elastomers to react with molecular oxygen in a degradation process called "autoxidation." This degradation process results in undesirable changes, such as product discoloration and loss of physical properties. Autoxidation may be initiated by heat (thermo-oxidative degradation), high energy radiation (photodegradation), mechanical stress, catalyst residues, or through reaction with other impurities. However, photodegradation by ultraviolet ("UV") radiation is believed to be the most damaging of these autoxidation mechanisms. Thermo-oxidation and photodegradation processes are initiated with the formation of free radicals. These free radicals react rapidly with oxygen to from peroxy radicals. These peroxy radicals may further react with the polymer chains leading to the formation of hydroperoxides.

On exposure to additional heat or light, hydroperoxides decompose to yield more radicals that can reinitiate the degradation process.

UV absorbers protect against photodegradation by "competing" with the polymer for absorption of ultraviolet light. An ideal UV absorber should be very light stable and should have broad, intense absorption over the UV range from about 290 nm to 400 nm.

Antioxidants, on the other hand, interrupt the degradation process in different ways according to their structure. The major classifications of antioxidants are primary antioxidants and secondary antioxidants. Primary antioxidants, such as sterically hindered phenols, react rapidly with peroxy radicals (ROO.) to break the degradation cycle. Secondary antioxidants, such as arylamines, are more reactive toward oxygen-centered radicals than are hindered phenols. The secondary antioxidants react with hydroperoxide (ROOH) to yield non-radical, non-reactive products, and are frequently called hydroperoxide decomposers.

The color instability caused by both thermo-oxidative degradation and photodegradation typically results in a "yellowing" or "browning" of the polyurethane layer, an undesirable characteristic for urethane compositions are to be used in the covers of golf balls, which are generally white.

Manufacturers have found that the use of primary antioxidants helps suppress the formation of free radical species and hydroperoxides, and that the use of UV absorbers and hindered amine light stabilizers ("HALS") helps protect polyurethanes from UV light-induced oxidation, either or both of which can result in unwanted discoloration of polyurethane-formed components. Antioxidants include primary antioxidants, such as sterically hindered phenols, that can react rapidly with peroxy radicals, secondary antioxidants, such as hydroperoxide decomposers, that react with hydroperoxide to yield non-radical, non-reactive products. Multifunctional antioxidants, such as hindered amine stabilizers ("HAS"), combine the functions of primary and secondary antioxidants and are known to those of ordinary skill in the art to be structurally interchangeable with HALS. Various references describing such compositions are set forth below.

U.S. Pat. No. 5,156,405 to Kitaoh et al. discloses a golf ball having a core, an ionomer cover, and a clear paint outer layer, where the cover and the outer layer each comprise a light stabilizer and a UV absorber. The light stabilizer and a UV absorber are present in the cover in an amount of from 0.1 to 5 parts, based on 100 parts by weight ionomer resin, and in the clear paint in an amount of from about 0.1 to 20 parts, based on 100 parts by weight paint solid. The ratio of the amount of light stabilizer ranges from 75/25 to 25/75 in the cover and from 75/25 to 5/95 in the clear paint.

U.S. Pat. No. 5,494,291 to Kennedy discloses a golf ball having a fluorescent cover and a UV light blocking, visibly transparent topcoat. The cover contains a fluorescent material that absorbs at least some UV light at wavelengths greater than 320 nm and emits visible light.

U.S. Pat. No. 5,692,974 to Wu et al. discloses golf balls which have covers and cores and which incorporate urethane ionomers. The polyurethane golf ball cover has improved resiliency and initial velocity through the addition of an alkylating agent such as t-butyl chloride to induce ionic interactions in the polyurethane and thereby produce cationic type ionomers. UV stabilizers, antioxidants, and light stabilizers may be added to the cover composition.

U.S. Pat. No. 5,823,890 to Maruko et al., discloses a golf ball formed of a cover of an inner and outer cover layer compression molded over a core. The inner and outer cover layers should have a color difference $\Delta E$ in Lab color space of up to 3.

U.S. Pat. No. 5,840,788 to Lutz et al. discloses a UV light resistant, visibly transparent, urethane golf ball topcoat composition for use with UV curable inks. The topcoat includes an optical brightener that absorbs at least some UV light at wavelengths greater than about 350 nm, and emits visible light, and a stabilizer package. The light stabilizer package includes at least one UV light absorber and, optionally, at least one light stabilizer, such as a HALS.

To date, it has been difficult for manufacturers to properly attain the desired long-term appearance of polyurethane compositions used in golf ball covers without adversely affecting golf ball performance. Many golf balls have at least one layer of "paint" covering the cover material, which paint can be a clear and/or pigmented topcoat material. Those of ordinary skill in the art should readily recognize that repeated blows with a golf club tend to result in exposure of the cover material to harmful UV rays for hours at a time, resulting in undesirable "yellowing" and/or "browning" of the cover material. Further, absent exposure of the polyurethane composition to direct UV radiation, degradation still occurs over a long time period and the resultant discoloration can "bleed" through the paint layer, also discoloring the golf ball cover. This long-felt problem in the golf ball art has now led the Applicants to seek a desirable formulation of a polyurethane composition suitable for use in golf ball covers that exhibits improved color stability upon prolonged exposure to UV light.

SUMMARY OF THE INVENTION

The present invention is directed to a golf ball including a center, a cover, and, optionally, at least one intermediate layer disposed between the center and the cover, wherein the cover is formed from a polyurethane composition, or a reaction product thereof, comprising at least one polyol; at least one polyisocyanate; at least one curing agent; and at least one color stabilizer; wherein the color stabilizer is present in an amount sufficient to provide a $\Delta C^*$ of less than about 22 upon exposure to UV light over a timeframe of 1 hour.

In one embodiment, the cover has at least one of a material hardness of less than about 80 Shore D, a flexural modulus of less than about 100,000 psi, a dimple coverage of greater than about 60% and an ATTI compression of less than about 120. In a preferred embodiment, the cover has at least one of a material hardness of less than about 70 Shore D, a flexural modulus of less than about 75,000 psi, a dimple coverage of greater than about 65% and an ATTI compression of less than about 100. In a more preferred embodiment, the cover has at least one of a material hardness of less than about 60 Shore D, a flexural modulus of less than about 60,000 psi, a dimple coverage of greater than about 70% and an ATTI compression of less than about 90.

In another embodiment, the color stabilizer includes UV absorbers, radical scavengers, hindered amine light stabilizers ("light stabilizers"), thermal stabilizers, antioxidants, quenchers,

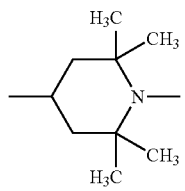

hydroperoxide decomposers, fillers, and combinations thereof. Preferably, the color stabilizer includes a UV absorber, a light stabilizer, or a combination thereof. It is preferred that the UV absorber include triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones, and mixtures thereof.

In yet another embodiment, the UV stabilizer is present in an amount between about 0.1 weight percent and about 10.0 weight percent. Preferably, the UV stabilizer is present in an amount between about 1.0 weight % to about 7.0 weight %, and more preferably, the UV stabilizer is present in an amount between about 3.0 weight % and about 7.0 weight %.

In an alternative embodiment, the UV stabilizer is present in an amount between about 0.1 weight percent and about 6.0 weight percent. Preferably, the UV stabilizer is present in an amount between about 1.0 weight % to about 5.0 weight %, and more preferably, the UV stabilizer is present in an amount between about 3.0 weight % and about 5.0 weight %.

In one embodiment, the light stabilizer comprises bis-(substituted) heteropolycyclicdione; N,N'-1,6-hexanediylbis{N-(2,2,6,6-tetramethyl-4-piperidinyl)-formamide}; dimethyl succinate polymer with 4-hydroxy-2,2,6,6-tetra-methyl-1-piperidine ethanol; bis-(1,2,2,6,6-pentamethyl-4-piperidinyl)sebacate; hindered amine; 3-dodecyl-1-(2,2,6,6-tetramethyl-4-piperidyl-pyrrolidin-2,5-dione; poly-methylpropyl-3-oxy-[4(2,2,6,6-tetramethyl)piperidinyl]siloxane; bis-(1,2,2,6,6-pentamethyl-4-piperidinyl)-sebacate; bis-(2,2,6,6-tetramethyl-4-piperidinyl)-sebacate; bis-(1-octyloxy-2,2,6,6,tetramethyl-4-piperidinyl) sebacate; n-butyl-(3,5-di-t-butyl-4-hydroxybenzyl)bis-(1,2,2,6-pentamethyl-4-piperidinyl)malonate;

bis-(2,2,6,6-tetramethyl-4-piperidinyl)sebacate; compounds containing at least one of the following structure:

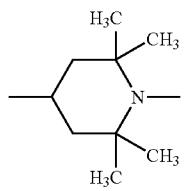

and mixtures thereof.

Preferably, the light stabilizer is present in an amount between about 0.01 weight % and about 3 weight %, more preferably, the light stabilizer is present in an amount between about 0.05 weight % and about 2 weight %, and most preferably, the light stabilizer is present in an amount between about 0.1 weight % and about 1.0 weight %.

In one embodiment, the polyisocyanate comprises 4,4'-diphenylmethane diisocyanate; polymeric MDI; carbodiimide-modified liquid MDI; 4,4'-dicyclohexylmethane diisocyanate; p-phenylene diisocyanate; m-phenylene diisocyanate, toluene diisocyanate; 3,3'-dimethyl-4,4'-biphenylene diisocyanate; isophoronediisocyanate; hexamethylene diisocyanate; naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; isocyanurate of HDI; isocyanurate of 2,4,4-trimethyl-1,6-hexane diisocyanate; tetracene diisocyanate; napthalene diisocyanate; anthracene diisocyanate; and mixtures thereof.

In a particularly preferred embodiment, the curing agent comprises a polyamine or a polyol. In still another embodiment, the curing agent comprises at least one aromatic polyamine. It is preferred that the polyurethane composition has an initial C* value of less than about 5 and an L* value of greater than about 87. More preferably, the polyurethane composition has an initial C* value of less than about 4 and an L* value of greater than about 87.

In another preferred embodiment, the polyurethane composition has a C* value of less than about 20 and an L* value of greater than about 86 after exposure to UV light for 1 hour, and more preferably, the polyurethane composition has a C* value of less than about 15 and an L* value of greater than about 86 after exposure to UV light for 1 hour.

In another embodiment, the polyurethane composition has a C* value of less than about 25 and an L* value of greater than about 85 after exposure to UV light for 2 hours, and more preferably, the polyurethane composition has a C* value of less than about 20 and an L* value of greater than about 85 after exposure to UV light for 2 hours.

In still another embodiment, the polyurethane composition has a C* value of less than about 25 and an L* value of greater than about 83 after exposure to UV light for 4 hours, and more preferably, the polyurethane composition has a C* value of less than about 23 and an L* value of greater than about 83 after exposure to UV light for 4 hours. In another embodiment, the polyurethane composition has a ΔL* value of greater than about −4 and an ΔC* value of less than about 22 after exposure to UV light for about 1 hour. Preferably, ΔC* is less than about 1, and more preferably, ΔC* is less than about 12.

In one embodiment, the polyurethane composition has a ΔL* value of greater than about −4 and an ΔC* value of less than about 22 after exposure to UV light for about 2 hours, more preferably, ΔC* is less than about 15, and most preferably, ΔC* is less than about 13. In another embodiment, the polyurethane composition has a ΔL* value of greater than about −7 and an ΔC* value of less than about 26 after exposure to UV light for about 4 hours, and more preferably, ΔC* is less than about 18.

In one embodiment, the cover comprises at least an inner cover layer and an outer cover layer comprising the polyurethane composition that is disposed about the inner cover layer. Preferably, the cover is at least about 0.02 inches thick, the cover has a material hardness of less than about 80 Shore D, or both. In another embodiment, a paint layer that is substantially free of UV absorber and light stabilizer is disposed about the cover. It is preferred that the at least one UV absorber and the at least one light stabilizer have a ratio of about 10:1 to about 60:1 and, more preferably, a ratio of about 30:1 to about 50:1.

The present invention is also directed to a golf ball comprising a center, a cover, and at least one intermediate layer disposed between the center and the cover, wherein the cover is formed from a polyurethane composition, or a reaction product thereof, comprising at least one UV absorber and at least one light stabilizer present in an amount sufficient to provide a $\Delta C^*$ of less than about 22 upon exposure to UV light over a timeframe of 1 hour.

The present invention is also directed to a golf ball comprising a center, a cover, and at least one intermediate layer disposed between the center and the cover, wherein the cover is formed from a polyurethane composition, or a reaction product thereof, including a prepolymer comprising at least one diisocyanate and at least one polyol; a curing agent; at least one UV absorber; and at least one light stabilizer; wherein the at least one UV absorber and light stabilizer are present in an amount sufficient to provide a $\Delta C^*$ of less than about 22 upon exposure to UV light over a timeframe of 1 hour.

The present invention is also directed to a golf equipment-forming composition including a reaction product of a prepolymer comprising at least one diisocyanate and at least one polyol; a curing agent comprising at least one polyamine; at least one UV absorber; and at least one light stabilizer; wherein the at least one UV absorber and light stabilizer are present in an amount sufficient to provide a $\Delta C^*$ of less than about 22 upon exposure to UV light over a timeframe of 1 hour.

The present invention is also directed to a method of inhibiting or preventing color degradation in a golf ball which includes providing a golf ball core; forming a cover about the core, wherein the cover is formed of a polyurethane composition, or a reaction product thereof, comprising at least one polyol, at least one polyisocyanate, at least one curing agent, and a color stabilizer present in an amount sufficient to provide a $\Delta C^*$ of less than about 22 upon exposure to UV light over a timeframe of 1 hour.

The present invention is also directed to a method of testing the color stability of a golf ball which includes providing a golf ball having an outermost cover formed of a stabilized polyurethane composition; exposing the outermost cover to UV light for at least one hour; and determining the $C^*$ value and $L^*$ value of the outermost cover.

DESCRIPTION OF THE PREFERRED EMBODIMENTS

This invention is directed to golf balls having a core, an optional intermediate layer, and a cover, at least one of which is formed of a polyurethane composition including a color stabilizer package. Preferably, the golf ball cover is formed of the polyurethane composition and includes the reaction product of a prepolymer including at least one polyisocyanate and at least one polyol, and at least one curing agent, in addition to the color stabilizer package. In a particularly preferred embodiment, the polyisocyanate is 4,4'-diphenylmethane diisocyanate ("MDI"), p-phenylene diisocyanate ("PPDI"), m-phenylene diisocyanate ("MPDI"), toluene diisocyanate ("TDI"), or a mixture thereof, the at least one polyol is polytetramethylene ether glycol ("PTMEG"), the curing agent is at least one of the isomers of 3,5-dimethylthio-2,4-toluenediamine, or a mixture thereof, and the color stabilizer package includes at least one of a UV absorber, a HALS, or a mixture thereof. In a most preferred embodiment, the polyisocyanate is MDI, the at least one polyol is PTMEG, the curing agent is at least one of the isomers of 3,5-dimethylthio-2,4-toluenediamine, or a mixture thereof, and the color stabilizer package includes at least one of a UV absorber, a HALS, or a mixture thereof.

Golf balls formed according to the invention may, for example, have a one-piece construction formed from a homogeneous mass consisting entirely of the polyurethane composition of the invention. Such balls may further include, if desired, blends of conventional golf ball cover and/or intermediate layer materials, such as those discussed herein or other materials available to those of ordinary skill in the art. One-piece balls formed with the materials disclosed herein are durable but do not provide great distance because of their relatively high spin and low velocity. Other embodiments of the present invention include two-piece, multi-layer construction, such as dual-core and dual-cover golf balls, and wound balls having cores, liquid centers, intermediate layers, and/or covers, with one or more of the layers including the polyurethane composition disclosed herein.

As used herein, the term "golf ball core" is used to refer to any portion of a golf ball surrounded by the cover. In the case of a golf ball having three or more layers, the term "golf ball core" includes at least one inner layer and typically refers to a center surrounded by at least one intermediate layer. Golf balls having at least two layers in the core are known as "dual core" golf balls. The center may be solid, gel-filled, hollow, or fluid-filled, e.g., gas or liquid. The term "inner core" is used interchangeably with "center" or "golf ball center," while the term "outer core" is used interchangeably with "intermediate layer" or "at least one intermediate layer." For example, one optional type of intermediate layer is a tensioned elastomeric material wound about the center. When a tensioned elastomeric material is included as an intermediate layer, the polyurethane compositions of the invention may be incorporated into the elastomeric material, the center, or both. An intermediate layer may be included within a ball having, for example, a single layer or multi-layer cover, a single layer or multilayer core, both a single layer cover and core, or both a multilayer cover and a multilayer core, or any similar such combination. Intermediate layers of the type described above are sometimes referred to in the art, and, thus, herein as well, as an inner cover layer, as an outer core layer, or as a mantle layer.

The polyurethane composition of the present invention includes the reaction product of polyisocyanate, at least one polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("$H_{12}$MDI"), p-phenylene diisocyanate ("PPDI"), m-phenylene diisocyanate ("MPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; isocyanurate of HDI; triisocyanate of 2,4,4-trimethyl-1,6-hexane diisocyanate ("TMDI"), tetracene diisocyanate, napthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" isocyanate monomer, typically less than about 0.1% to about 0.5% free monomer. Examples of "low free monomer" diisocyanates include, but are not limited to Low Free Monomer MDI, Low Free Monomer TDI, Low Free MPDI, and Low Free Monomer PPDI.

The at least one polyisocyanate should have less than about 14% unreacted NCO groups. Preferably, the at least one polyisocyanate has less than about 7.9% NCO, more preferably, between about 2.5% and about 7.8%, and most preferably, between about 4% to about 6.5%. Any polyol available to one of ordinary skill in the art is suitable for use according to the invention. Exemplary polyols include, but are not limited to, polyether polyols, hydroxy-terminated polybutadiene and partially/fully hydrogenated derivatives, polyester polyols, polycaprolactone polyols, and polycarbonate polyols. In one preferred embodiment, the polyol includes polyether polyol, more preferably those polyols that have the generic structure:

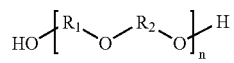

where $R_1$ and $R_2$ are straight or branched hydrocarbon chains, each containing from 1 to about 20 carbon atoms, and n ranges from 1 to about 45. Examples include, but are not limited to, polytetramethylene ether glycol, polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Preferred polyester polyols have the generic structure:

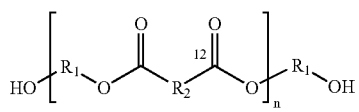

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups. In another embodiment, polycaprolactone polyols are included in the materials of the invention.

Preferably, any polycaprolactone polyols have the generic structure:

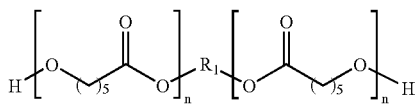

where $R_1$ is a straight chain or branched hydrocarbon chain containing from 1 to about 20 carbon atoms, and n is the chain length and ranges from 1 to about 20. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Preferably, any polycarbonate polyols have the generic structure:

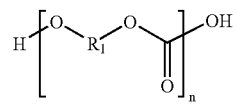

where $R_1$ is predominantly bisphenol A units -(p-$C_6H_4$)—C($CH_3$)$_2$-(p-$C_6H_4$)— or derivatives thereof, and n is the chain length and ranges from 1 to about 20. Suitable polycarbonates include, but are not limited to, polyphthalate carbonate. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives have the general formula:

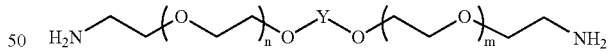

where n and m each separately have values of 0, 1, 2, or 3, and where Y is ortho-cyclohexyl, meta-cyclohexyl, para-cyclohexyl, ortho-phenylene, meta-phenylene, or para-phenylene, or a combination thereof. Preferred polyamine curatives include, but are not limited to, 3,5-dimethylthio-2,4-toluenediamine and isomers thereof (tradename ETHACURE 100 and/or ETHACURE 100 LC); 3,5-diethyltoluene-2,4-diamine and isomers thereof such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; para, para'-methylene dianiline (MDA), m-phenylenediamine (MPDA), 4,4'-methylene-bis-(2-chloroaniline) (MOCA), 4,4'-methylene-bis-(2,6-diethylaniline), 4,4'-diamino-3,3'-diethyl-5,5'-dimethyl diphenylmethane, 2,2',3,3'-tetrachloro diamino diphenylmethane, 4,4'-methylene-bis-(3-chloro-2,6-diethylaniline), (LONZACURE M-CDEA), trimethylene glycol di-p-aminobenzoate (VERSALINK 740M), and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000. Preferably, n and m, each separately, have values of 1, 2, or 3, and preferably, 1 or 2.

At least one of a diol, triol, tetraol, hydroxy-terminated, may be added to the aforementioned polyurethane composition. Suitable hydroxy-terminated curatives have the following general chemical structure:

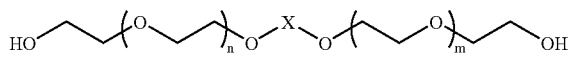

where n and m each separately have values of 0, 1, 2, or 3, and where X is ortho-phenylene, meta-phenylene, para-phenylene, ortho-cyclohexyl, meta-cyclohexyl, or para-cyclohexyl, or mixtures thereof. Preferably, n and m, each separately, have values of 1, 2, or 3, and more preferably, 1 or 2.

Preferred hydroxy-terminated curatives for use in the present invention include at least one of 1,3-bis(2-hydroxyethoxy)benzene and 1,3-bis-[2-(2-hydroxyethoxy)ethoxy]benzene, and 1,3-bis-{2-[2-(2-hydroxyethoxy)ethoxy]ethoxy}benzene; 1,4-butanediol; resorcinol-di-($\beta$-hydroxyethyl)ether; and hydroquinone-di-($\beta$-hydroxyethyl)ether; and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art. Both the hydroxy-terminated and amine curatives can include one or more saturated, unsaturated, aromatic, and cyclic groups. Additionally, the hydroxy-terminated and amine curatives can include one or more halogen groups. Suitable diol, triol, and tetraol groups include ethylene glycol, diethylene glycol, polyethylene glycol, propylene glycol, polypropylene glycol, lower molecular weight polytetramethylene ether glycol, and mixtures thereof. The polyurethane composition can be formed with a blend or mixture of curing agents. If desired, however, the polyurethane composition may be formed with a single curing agent.

Any method available to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as the prepolymer method. In this method, the polyisocyanate and the polyol are mixed separately prior to addition of the curing agent. This method affords a more homogeneous mixture resulting in a more consistent polymer composition.

An optional, but preferred, filler component may be chosen to adjust the density of the blends described herein. The selection of such filler(s) is dependent upon the type of golf ball desired (i.e., one-piece, two-piece multi-component, or wound), and any filler available to one of ordinary skill in the art is suitable for use according to the invention. Examples of useful fillers include zinc oxide ("ZnO"), barium sulfate, calcium oxide, calcium carbonate, and silica, as well as any salts and oxides thereof. Additional fillers, such as foaming agents, glass and/or plastic microspheres, and various metals, can be added to the polyurethane compositions of the present invention, in amounts as needed, for their well-known purposes. Additional components which can be added to the polyurethane composition include UV stabilizers and other dyes, as well as optical brighteners, fluorescent pigments, and dyes. Such additional ingredients may be added in any amounts that will achieve their desired purpose. As discussed herein, however, it is preferred to include one or more color stabilizers according to the invention in at least the outermost layer of the golf ball just beneath the outermost topcoat of the golf ball, which color stabilizer(s) can supplement or replace any conventional UV stabilizers.

Thus, it is also preferred that the polyurethane composition of the present invention include at least one color stabilizer. Color stabilizers include, but are not limited to, UV absorbers, radical scavengers, such as hindered amine light stabilizers ("HALS"), thermal stabilizers and antioxidants, quenchers, such as nickel quenchers, hydroperoxide decomposers, fillers, and mixtures thereof. It has been determined that fillers, such as ZnO and TiO2, pigments, and paints, have some UV absorbing and/or blocking qualities, and as such, can contribute to the color stability of the polyurethane composition.

Suitable UV absorbers include, but are not limited to, triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones, salicylates, and mixtures thereof. Without wishing to be bound by any particular theory, it is believed that these compounds absorb harmful UV light and rapidly convert the light into harmless energy, such that the compounds reduce or prevent the rapid degradation of color in many conventional golf balls.

Preferred substituted triazines include those having the formula:

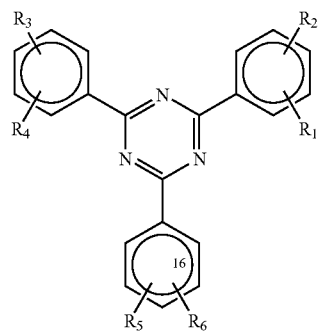

wherein R₁ is H, OH; R₂ is H, alkoxy, alkylester, hydroxyalkoxy; R₃ is alkyl, H; R₄ is alkyl, H, alkylester; R₅ is alkyl, H; and R₆ is alkyl, H, alkylester.

Preferred benzoxazinones include those including the formula:

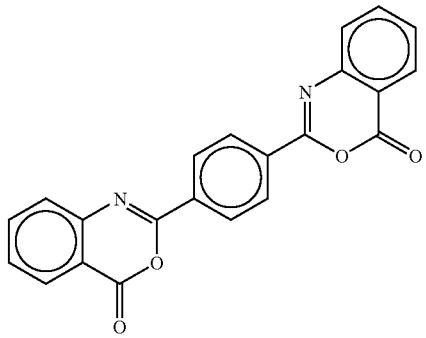

Preferred benzotriazoles include those having the formula:

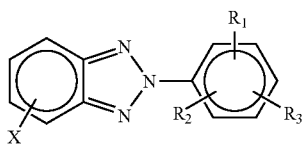

wherein R₁ is OH; R₂ is alkyl, hydroxyalkyl, acryloxyalkyl, (hydroxyphenyl)alkyl, (alkylester)alkyl, (hydroxyalkylether)oxoalkyl, phenylalkyl; R₃ is H, alkyl; and X is Cl, Br, I. Preferably X is Cl.

Preferred benzophenones include those having the formula:

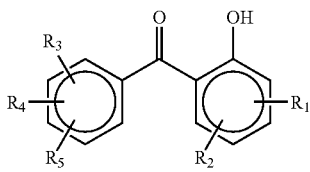

wherein R₁ is OH, alkoxy, alkenoic acid alkoxyester, aryloxy, hydroxyalkoxy, hydroxy(alkylether)alkoxy, (polymerized acrylo)alkoxyester, o-alkyl acid ester; R₂ is H, SO₃H, SO₃Na; and R₃ is H, OH; R₄ is H, alkoxy, OH; and R₅ is H, SO₃Na.

Preferred benzoates include those having the formula:

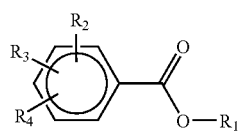

wherein R₁ is hydroxyalkylether, alkylphenyl, alkyl, phenyl, hydroxyphenyl; R₂ is H, OH, alkyl, hydroxy(alkylether) amino; R₃ is H, alkyl, OH; and R₄ is H, alkyl.

Preferred formamidines include those having the formula:

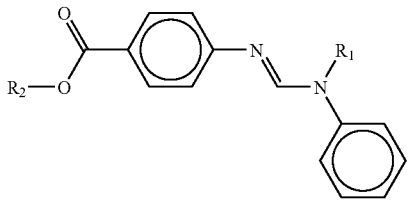

wherein R₁ is alkyl, R₂ is alkyl.

Preferred cinnamates or propenoates include those having the formula:

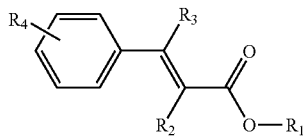

wherein R₁ is alkyl; R₂ is alkylester, cyano; R₃ is H, phenyl; and R₄ is H, alkoxy.

Preferred aromatic propanediones include those having the formula:

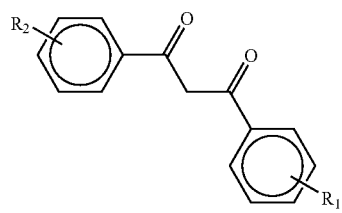

wherein R₁ is alkoxy; and R2 is alkyl.

Preferred benzimidazoles include those having the formula:

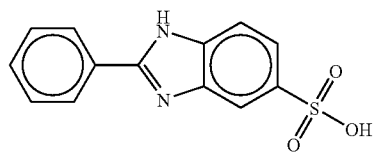

Preferred cycloaliphatic ketones include those having the formula:

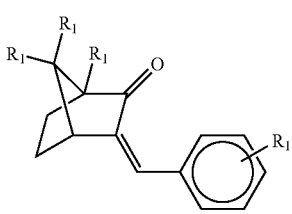

wherein R₁ is alkyl.

Preferred formanilides (including oxamides) include those having the formula:

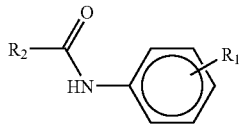

wherein $R_1$ is alkyl; $R_2$ is H, formanilide, alkylalkoxy, and/or contains benzimidazole.

Preferred cyanoacrylates include those having the formula:

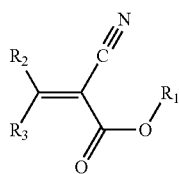

wherein $R_1$ is alkyl arylcyanoacrylalkyl; $R_2$ is phenyl, H, alkylindoline; and $R_3$ is H, phenyl.

Preferred benzopyranones include those having the formula:

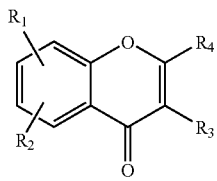

wherein $R_1$; $R_2$; $R_3$; and $R_4$ are OH.

Preferred salicylates include those having the formula:

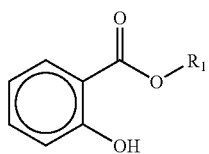

wherein $R_1$ is a linear, cyclic, or branched alkyl group.

The above structures are not intended to be inclusive. One of ordinary skill in the art would be aware that "cross-over" between groups exists, including isomeric structures, and as such, these groups are also suitable in the compositions of the invention.

Suitable aromatic propanedione UV absorbers include, but are not limited to, 4-t-Butyl-4'-methoxydibenzoylmethane or avobenzone, GIVSORB UV-14; and mixtures thereof.

Suitable benzimidazole UV absorbers include, but are not limited to, 2-Phenyl-1H-benzimidazole-5-sulfonic acid, GIVSORB UV-16; and mixtures thereof.

Suitable benzophenone UV absorbers include, but are not limited to, 2-Hydroxy-4-n-octyloxybenzophenone, UVINUL 3008; 2-Hydroxy-4-methoxybenzophenone, UVINUL 3040; 2-Hydroxy-4-methoxy-5-sulfobenzophenone or Sulisobenzone, UVINUL MS 40; 2-(4-Benzoyl-3-hydroxyphenoxy)-2-propenoic acid ethyl ester, CYASORB UV 2098; Homopolymer of 4-(2-Acryloyloxyethoxy)-2-hydroxybenzophenone, CYASORB UV 2126; 2,2'-Dihydroxy-4-methoxybenzophenone or Dioxybenzone, CYASORB UV 24; 2-Hydroxy-4-(2-hydroxy-3-decyloxypropoxy)benzophenone and 2-Hydroxy-4-(2-hydroxy-3-octyloxypropoxy)benzophenone, MARK 1535; 2,4,4'-Trihydroxybenzophenone, MAXGARD 200; 2-Hydroxy-4-(isooctyloxy)benzophenone, MAXGARD 800; 2-Hydroxy-4-dodecyloxybenzophenone, UVINUL 410; 2,2'-Dihydroxy-4,4'-dimethoxy-5,5'-disulfobenzophenone, disodium salt, UVINUL 3048; 2,4-Dihydroxybenzophenone or 4-Benzoylresorcinol, UVINUL 400; 2,2'-Dihydroxy-4,4'-dimethoxybenzophenone, UVINUL D 49; 2,2',4,4'-Tetrahydroxybenzophenone, UVINUL D 50; 2,2'-Dihydroxy-4-(2-hydroxyethoxy)benzophenone, UVINUL X-19; 2-Hydroxy-4-benzyloxybenzophenone, Seesorb 105; and mixtures thereof.

Suitable benzopyranone UV absorbers include, but are not limited to, 3,3',4',5,7-pentahydroxyflavone or quercetin; and mixtures thereof.

Suitable benzotriazole UV absorbers include, but are not limited to, 2-[2-hydroxy-5-(1,1,3,3-tetramethylbutyl)phenyl]benzotriazole, TINUVIN 329; 2-(2'-hydroxy-5'-(2-hydroxyethyl))benzotriazole, NORBLOC 6000; 2-(2'-hydroxy-5'-methacrylyloxyethylphenyl)-2H-benzotriazole, NORBLOC 7966; 1,1,1-tris(hydroxyphenyl)ethane benzotriazole, THPE BZT; 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109; a-[3-[3-(2H-benzotriazol-2-yl)-5-t-butyl-4-hydroxyphenyl]-1-oxopropyl]-w-hydroxypoly(oxy-1,2-ethanediyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropoxy]poly(oxy-1,2-ethanediyl), TINUVIN 1130; 2-(2-Hydroxy-3,5-di-t-butylphenyl)benzotriazole, TINUVIN 320; 2-(2-hydroxy-3-t-butyl-5-methylphenyl)-5-chloro-2H-benzotriazole, TINUVIN 326; 2-(3'-5'-di-t-butyl-2'-hydroxyphenyl)-5-chlorobenzotriazole, TINUVIN 327; 2-(2-Hydroxy-3,5-di-t-amylphenyl)benzotriazole, TINUVIN 328; 3-(2H-Benzotriazol-2-yl)-5-t-butyl-4-hydroxybenzenepropanoic acid, TINUVIN 384; 2-(2H-benzotriazol-2-yl)-4-methyl-6-dodecylphenol, TINUVIN 571; 3-(2H-benzotriazol-2-yl)-5-t-butyl-4-hydroxy-1,6-hexanediyl ester of benzenepropanoic acid and 3-(2H-benzotriazol-2-yl)-5-t-butyl-4-hydroxy-methyl ester of benzenepropanoic acid, TINUVIN 840; 2-[2-hydroxy-3,5-bis-(1,1-dimethylbenzyl)phenyl]-2H-benzotriazole, TINUVIN 900; 2-(2H-benzotriazol-2-yl)-6-(1-methyl-1-phenylethyl)-4-(1,1,3,3-tetramethylbutyl) phenol, TINUVIN 928; 3-(2H-benzotriazol-2-yl)-5-t-butyl-4-hydroxybenzenepropanoic acid, C7-9 branched and linear alkyl esters, TINUVIN 99; 2-(2-hydroxy-5-methylphenyl) benzotriazole, TINUVIN P; 2-(2'-hydroxy-3'-sec-butyl-5'-t-butylphenyl)benzotriazole, TINUVIN 350; 2-(2'-hydroxy-5'-t-butylphenyl)benzotriazole, TINUVIN PS; bis[2-hydroxy-3-(2H-benzotriazol-2-yl)-5-octylphenyl]methane, TINUVIN 360; and mixtures thereof.

Suitable benzoate UV absorbers include, but are not limited to, hexadecyl 3,5-di-t-butyl-4-hydroxybenzoate, CYASORB UV 2908; 3-hydroxyphenylbenzoate, SEESORB 300; ethyl-4-[[(ethylphenylamino)methylene]amino] benzoate, GIVSORB UV-1; Phenyl 2-hydroxybenzoate or phenylsalicylate, SEESORB 201; 2,4-di-t-butylphenyl-3,5-di-t-butyl-4-hydroxybenzoate, TINUVIN 120; 4-Bis(polyethoxy)amino acid polyethoxy ethyl ester, UVINUL P 25; 4-t-Butylphenyl 2-hydroxybenzoate or 4-t-butylphenylsalicylate, Seesorb 202; and mixtures thereof.

Suitable benzoxazinone UV absorbers include, but are not limited to, 2,2'-(p-phenylene)di-3,1-benzoxazin-4-one, CYASORB 3638; and mixtures thereof.

Suitable cinnamates or propenoate UV absorbers include, but are not limited to, dimethyl (p-methoxybenzylidene) malonate, SANDUVOR PR 25; 3-(4-methoxyphenyl)-2-propenoic acid 2-ethylhexyl ester or octyl p-methoxycinnamate, UVINUL 3039; and mixtures thereof.

Suitable cyanoacrylate UV absorbers include, but are not limited to, ethyl-2-cyano-3,3-diphenylacrylate, UVINUL 3035; 2-ethylhexyl-2-cyano-3,3-diphenylacrylate, UVINUL 3039; 1,3-bis-[(2'-cyano-3,3'-diphenylacryloyl)oxy]-2,2-bis-{[(2-cyano-3',3'-diphenylacryloyl)oxy]methyl}propane, UVINUL 3030; 2-Cyano-3-(2-methylindolinyl)methylacrylate, UV Absorber Bayer 340; and mixtures thereof.

Suitable cycloaliphatic ketone UV absorbers include, but are not limited to, 3-(4-methylbenzylidene)-D,L-camphor, GIVSORB UV-15; and mixtures thereof.

Suitable formamidine UV absorbers include, but are not limited to, Ethyl-4-[[(methylphenylamino)methylene]amino]benzoate, GIVSORB UV-2; and mixtures thereof.

Suitable formanilide (including oxamide) UV absorbers include, but are not limited to, N-(2-ethoxyphenyl)-N'-(4-isododecylphenyl)oxamide, SANDUVOR 3206; N-[5-t-Butyl-2-ethoxyphenyl]-N'-(2-ethylphenyl)oxamide, TINUVIN 315; N-(2-ethoxyphenyl)-N'-(2-ethylphenyl)oxamide, TINUVIN 312; 2H-benzimidazole-2-carboxylic acid (4-ethoxyphenyl) amide, UVINUL FK 4105; and mixtures thereof.

Suitable triazine UV absorbers include, but are not limited to, 2-[4,6-bis(2,4-dimethylphenyl)-1,3,5-triazin-2-yl]-5-octyloxyphenol, CYASORB UV 1164; confidential triazine derivative, TINUVIN 1545; 2-(4,6-diphenyl-1,3,5-triazin-2-yl)-5-hexyloxyphenol, TINUVIN 1577 FF; 2-[4-((2-Hydroxy-3-dodecyloxypropyl)oxy)-2-hydroxyphenyl]-4,6-bis (2,4-dimethylphenyl)-1,3,5-triazine, TINUVIN 400; 2,4,6-Trianilino-p-(carbo-2'-ethylhexyl-1'-oxy)-1,3,5-triazine, UVINUL T-150; and mixtures thereof.

Suitable salicylate UV absorbers include, but are not limited to, 3,3,5-trimetylcyclohexylsalicylate or homomentyylsalicylate, NEO HELIOPAN HMS; menthyl-o-aminobenzoate, NEO HELIOPAN MA; and mixtures thereof.

The TINUVIN compounds are commercially available from Ciba Specialty Chemicals Corporation of Tarrytown, N.Y.; UVINULS are commercially available from BASF Corporation of Charlotte, N.C.; CYASORBS are commercially available from Cytec Industries Inc. of West Paterson, N.J.; SANDUVORS are commercially available from Clariant Corporation of Charlotte, N.C.; NORBLOCS are commercially available from Janssen Pharmaceutica of Titusville, N.J.; Quercetin is commercially available from ACROS Organics of Pittsburgh, Pa.; MAXGARDS are commercially available from Garrison Industries of El Dorado, Ark.; SEESORBS are commercially available from Shipro Kasei of Osaka, Japan; MARK compounds are commercially available from Witco Chemical of Oakland, N.J.; GIVSORBS are commercially available from Givauden-Roure Corp. of Geneva, Switzerland; and NEO HELIOPANS are commercially available from Haarmann & Reimer of Teterboro, N.J.

Other suitable UV absorbers include inorganic pigments such as titanium dioxide, zinc oxide, barium sulfate, violet, PALIOGEN Blue L 6385, ultra marine blue, and other blue pigments; and mixtures thereof.

In a particularly preferred embodiment, the at least one UV absorber is a liquid. Preferably, the UV absorber is a liquid when the UV absorber is present in an amount greater than about 1% of the total polyurethane composition. Suitable liquid UV absorbers include, but are not limited to, UVINUL 3039; 2-ethylhexyl p-methoxycinnamate, NEO HELIOPAN AV; UVINUL P25; isoamyl p-methoxycinnamate, NEO HELIOPAN E1000; 2-ethylhexylsalicylate, NEO HELIOPAN OS; 3,3,5-trimetylcyclohexylsalicylate or homomentyylsalicylate, NEO HELIOPAN HMS; menthyl-o-aminobenzoate, NEO HELIOPAN MA; TINUVIN 99; TINUVIN 384; TINUVIN 213; TINUVIN 1130; TINUVIN 109; TINUVIN 400; TINUVIN 571; SANDUVOR 3206; MAXGARD 800; MARK 1535; GIVSORB UV-1; or mixtures thereof.

In a preferred embodiment, the selected UV absorber has an extinction coefficient, $\epsilon$, of greater than about 10,000 L·mol-1·cm-1 at any wavelength between about 290 nm and about 350 nm. More preferably, the selected UV absorber has an $\epsilon$ of between about 10,000 L·mol-1·cm-1 and about 30,000 L·mol-1·cm-1 at wavelengths between about 290 nm and about 350 nm, and most preferably, between about 10,000 L·mol-1·cm-1 and about 20,000 L·mol-1·cm-1 at wavelengths between about 290 nm and about 350 nm. Without wishing to be bound by any particular theory, it is believed that spectrally matching the peak absorbance of the UV absorber to that of the polymer composition provides the most ideal color and light stabilization. For example, UV absorbers that have an absorbance maximum at wavelengths higher than the polyurethane composition have been found to be less effective than those that absorb at wavelengths that more closely match the absorbance of the polymer, even if the amplitude of the absorbance is lower.

Preferably, the UV absorbers have certain local absorption maxima between about 280 nm and about 400 nm, as measured in a dilute solution of a non-hydrogen-bonding solvent, such as chloroform or methylene chloride. The UV absorbers may have a single local maximum between about 300 nm to about 360 nm, more preferably between about 315 nm to about 340 nm. Example include, but are not limited to, SANDUVOR VSU, UVINUL 3030, SANDUVOR PR 25, GIVSORB UV-15, and mixtures thereof. Most preferably, the UV absorbers have two local absorption maxima, the first being in the region between about 285 nm and about 315 nm, and the second being in the region between about 320 nm and about 370 nm. Examples of these include, but are not limited to, TINUVIN 328, NORBLOC 6000, NORBLOC 7966, CYASORB 2337, TINUVIN P, GIVSORB UV-13, CYASORB 3638, UVINUL D50, CYASORB UV 24, and mixtures thereof.

Without wishing to be bound by any particular theory, it is believed that radical scavengers, such as hindered amine light stabilizers, function primarily as free radical scavengers. Commercially available examples include, but are not limited to, bis-(1-octyloxy-2,2,6,6-tetramethyl-4-piperidinyl) sebacate, TINUVIN 123, n-butyl-(3,5-di-t-butyl-4-hydroxybenzyl)bis-(1,2,2,6-pentamethyl-4-piperidinyl)malonate, TINUVIN 144, TINUVIN 292, TINUVIN 400, dimethyl succinate with 4-hydroxy-2,2,6,6-tetramethyl-1-piperidineethanol, TINUVIN 622; bis(1,2,2,6,6-pentamethyl-4-piperidinyl)sebacate, bis-(1,2,2,6,6-pentamethyl-4-piperidinyl)sebacate, TINUVIN 765; and bis-(2,2,6,6-tetramethyl-4-piperidinyl)sebacate, TINUVIN 770 from Ciba Specialty Chemicals Corporation; dimethyl succinate with 4-hydroxy-2,2,6,6-tetramethyl-1-piperidineethanol, CHIMASSORB 119; poly{[6-(1,1,3,3-tetramethyl(butyl) amino]-s-triazine-2,4-diyl}[(2,2,6,6-tetramethyl-4-piperidyl)imino]hexamethylene[(2,2,6,6-tetramethyl-4-piperidyl)imino], CHIMASSORB 944; and 1,6-hexanediamine, N,N'-bis-(2,2,6,6-tetramethyl-4-piperidinyl), CHIMASSORB 2020, also from Ciba Specialty Chemicals Corporation; CYNASORB UV-3581 from Cytec Industries Inc; SANDUVOR 3070 from Clariant Corporation of Charlotte, N.C.; UVINULS 4049 H and 4050 H from BASF Corporation; bis-(substituted)heteropolycyclicdione, UVINUL 4049 H; N,N'-1,6-hexanediylbis{N-(2,2,6,6-tetramethyl-4-piperidinyl)-formamide}, UVINUL 4050 H; dimethyl succinate polymer with 4-hydroxy-2,2,6,6-tetra-methyl-1-piperidine ethanol, TINUVIN 622LD; hindered amine; SANDUVOR 3070; 3-dodecyl-1-(2,2,6,6-tetramethyl-4-piperidyl-pyrrolidin-2,5-dione, CYASORB UV-3581; polymethylpropyl-3-oxy-[4(2,2,6,6-tetramethyl) piperidinyl]siloxane; bis-(1,2,2,6,6-pentamethyl-4-piperidinyl)-sebacate; bis-(2,2,6,6-tetramethyl-4-piperidinyl)-sebacate; bis-(1-octyloxy-2,2,6,6,tetramethyl-4-piperidinyl)sebacate; n-butyl-(3,5-di-t-butyl-4-hydroxybenzyl)bis-(1,2,2,6-pentamethyl-4-piperidinyl)malonate; bis(2,2,6,6-tetramethyl-4-piperidinyl)sebacate; and mixtures thereof.

Examples of other suitable HALS typically include, but are not limited to, those containing at least one of the following structure:

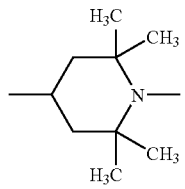

Without wishing to be bound by any particular theory, it is believed that thermal stabilizers and antioxidants protect polymers against thermo-oxidative degradation. These stabilizers include, but not limited to IRGANOX 245, IRGANOX 1010, IRGANOX 1076, IRGANOX 1135, IRGANOX 5057, and IRGANOX MD 1024 from Ciba Specialty Chemicals Corporation; CYANOXS 790 and 1791 from Cytec Industries Inc; SANDOSTAB P-EPQ from Clariant Corporation; UVINULS 2003 AO and 2012 AO from BASF Corporation; tris(mono-nonylphenyl)phosphite, UVINUL 2003 AO; 1-glyceryl oleate and DL-alpha-tocopherol, UVINUL 2012 AO; triethyleneglycol bis-93-(3'-t-butyl-4'-hydroxy-5'-methyl-phenyl)-propionate, IRGANOX 245; tetrakis[3,5-di-t-butylhydroxyhydro-cinnamate)]-methane, IRGANOX 1010; 3,5-di-t-4-hydroxy-hydrocinnamic acid and $C_{7-9}$-branched alkyl esters, IRGANOX 1135; aryl phosphonite, SANDOSTAB P-EPQ; tris(mono-nonylphenyl) phosphite, NAUGARD P; and mixtures thereof.

Also suitable as antioxidants include, but are not limited to, many hindered phenols, such as 2,6-di-t-butyl-4-methyl-phenol; 2,6-di-t-butyl-4-nonyl-phenol; 2,2'-methylene-bis-(4-methyl-6-t-butyl-phenol); 4,4'-butylidene-bis-(2-t-butyl-5-methyl-phenol); 4,4'-thio-bis-(2-t-butyl-5-methyl-phenol); 2,2'-thio-bis(6-t-butyl-4-methyl-phenol); 2,5-di-t-amyl-hydroquinone; polymeric sterically hindered phenol; octadecyl-3-(3',5'-di-t-butyl-4'-hydroxyphenyl)propionate; tetrakismethylene(3,5-di-t-butyl-4-hydroxyhydrocinnamate)methane; tris(3,5-di-t-butyl-4-hydroxybenzyl)isocyanurate; 2,2'-thiodiethyl bis-(3,5-di-t-butyl-4-hydroxyphenyl)propionate; 1,1,3-tris-(2'-methyl-4'-hydroxy-5'-t-butyl-phenyl)-butane; 2,2'-methylene-bis-6-(1-methyl-cyclohexyl)-papa-cresol; 2,4-dimethyl-6-(1-methyl-cyclohexyl)-phenol; N,N'-hexamethylene bis-(3,5-di-t-butyl-4-hydroxy-hydrocinnamamide); octadecyl-3,5-di-t-butyl-4-hydroxyhydrocinnamate; N-phenylbenzeneamine; reaction products with 2,4,4-trimethylpentene; and mixtures thereof.

Other suitable antioxidants include hindered phenols with the generic structure:

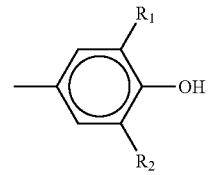

wherein $R_1$ and $R_2$ are t-butyl groups, alkyl groups, or oxyalkylenes; phosphites with the generic structure:

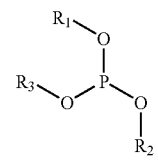

wherein $R_1$, $R_2$, and $R_3$ are alkyl groups or phenyl groups; thioesters having the generic structure:

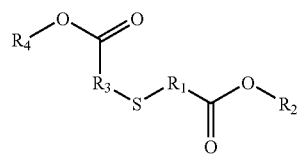

wherein $R_1$, $R_2$, $R_3$, and $R_4$ are alkyl groups; and mixtures thereof.

Phosphites, such as tris-(2,4-di-t-butyl-phenyl)phosphite; tris-(2,4-di-t-butyl-phenyl)phosphite plus distearyl-3,3-thiodipropionate (about 3% on phosphite); bis-(2,4-di-t-butyl-phenyl)pentaerylthritol-diphosphite; tetrakis-(2,4-di-t-butyl-phenyl)4,4'-biphenylene-diphosphonite; tris-(p-nonylphenyl)phosphite; diisodecyl-phenyl-phosphite; diphenyl-isodecyl-phosphite; triisodecyl-phosphite; trilauryl-phosphite; and mixtures thereof, are also suitable antioxidants, as are many thioesters, such as di-lauryl-3,3'-thio-dipropionate; di-stearyl-3,3'-thio-dipropionate; and mixtures thereof.

Quenchers are light stabilizers able to take over the energy absorbed by the chromophores present in a plastic material and to dispose of it efficiently to prevent degradation. The energy can be dissipated either as heat or as fluorescent or phosphorescent radiation. For energy transfer to occur from an excited chromophore to the quencher, the latter must have lower energy states than the donor. Without wishing to be bound by any particular theory, it is believed that the transfer can proceed according to two general mechanisms. The first process, the long range energy transfer or Forester mechanism, is based on a dipole-dipole interaction and is usually observed in the quenching of excited singlet states. The distance between chromophore and quencher may be as large as 5 or 10 nm, provided there is a strong overlap between the emission spectrum of the chromophore and the absorption spectrum of the quencher. The Forester mechanism has been considered as a possible stabilization mechanism by typical UV absorbers with extinction coefficients greater than 10,000 L·mol-1·cm-1. Though quenching of carbonyl compounds through this mechanism has been postulated several times it has not been shown unequivocally.

The second type of process quenchers may operate with is the so-called contact, or collisional, or exchange energy transfer. For an efficient transfer to take place, the distance between quencher and chromophore must not exceed about 1.5 nm. This means that the stabilization that can be achieved will depend on the concentration of the quencher and on the lifetime of the excited donor. Considering the longer lifetimes of excited triplet states compared to those of singlet states, energy transfer from triplet states is more likely.

Suitable quenchers, include, but are not limited to nickel dibutyldithiocarbamate; thio bis 2,2'-[4-(1,1,3,3-tetramethylbutyl)-phenyl]nickel-2-ethyl hexanoate; n-butylamine-nickel-2,2'-thio bis(4-t-octylphenolate); nickel-bis-[2,2'-thio bis(4-t-octylphenolate)]; and mixtures thereof, all commercially available from Ciba Corporation.

In another embodiment of the present invention, color stabilization of the polyurethane cover compositions is provided by in situ UV absorbers. In this embodiment, these "reactive" UV stabilizers are chemically bound directly to the polymer backbone, usually to one of the prepolymer components. Without being bound by theory, it is believed that attaching the stabilizers in this manner prevents migration of the stabilizers out of the polymer, and therefore increases the length of time for which color stabilization is provided to the polyurethane composition. Preferred in situ UV absorbers include, but are not limited to, piperidine-based compounds.

The at least one UV stabilizer should be present in an amount between about 0.1 weight percent and about 6.0 weight percent, more preferably between about 1.0 weight percent to about 5.0 weight percent, and most preferably, between about 3.0 weight percent and about 5.0 weight percent. The HALS, if present, is preferably present in an amount between about 0.01 weight percent and about 3 weight percent, more preferably, between about 0.05 weight percent and about 2 weight percent, and most preferably, between about 0.1 weight percent and about 1.0 weight percent.

In a preferred embodiment, the color stabilizer package comprises at least one UV absorber and at least one HALS. Preferably, the ratio of UV absorber to HALS is between about 1:1 to about 100:1, more preferably between about 7:1 to about 70:1, and most preferably, between about 30:1 to about 60:1.

In an alternative embodiment, the color stabilizer package comprises at least one UV absorber and at least one HALS. Preferably, the ratio of UV absorber to HALS is between about 1:1 to about 50:1, more preferably between about 7:1 to about 50:1, and most preferably, between about 30:1 to about 50:1.

It is well known to one of ordinary skill in the art that the human visual system, which consists of rods that are sensitive to lightness and darkness (white and black, respectively), and cones that respond to color, can be simulated using mathematical models. All existing models derive values from a visible spectrum of a material that can be obtained from a color spectrometer (or colorimeter), that measures the intensity of reflected light (for opaque samples) in the region of the electromagnetic spectrum visible to humans (approximately 400 to 740 nm).

The CIELCh and CIELAB systems are standard color systems well known in the art of color and appearance to describe the effective "color" of an object. The differences in color between a reference and a test specimen can easily be expressed in terms of the CIELCh or CIELAB values which indicate both magnitude and direction of color difference. Therefore, either the CIELCh or CIELAB systems can be used to measure the color of the polyurethane compositions of the invention. The CIELCh scale separates the "color" of a sample into three parameters on a cylindrical polar coordinate system. In the CIELCh system, $L^*$ defines the darkness or lightness, (black and white) component of a sample. For example, an $L^*$ value of 100 is pure white, or completely reflective at all wavelengths, whereas an $L^*$ value of 0 is pure black, or absorbing all wavelengths of light. $C^*$, however, is a measure of chroma (saturation) and is a vector distance from the center ($L^*$ axis) of the color space. Hue (h°) is the third parameter and is represented as an angle ranging from 0° to 360°, where 0°=red, 90°=yellow, 180°=green, and 270°=blue.

It has been determined that, as an unpainted golf ball cover ages during normal usage due to exposure to UV light, the $L^*$ values decrease (become darker) and the $C^*$ values increase. The hue tends to remain near 90° (i.e., yellow), and may drift slightly higher into the greenish yellow or slightly lower into the reddish yellow. This is a relatively subtle and less visually perceptible change than the increase in chroma, $C^*$. Since the $C^*$ increase is essentially traveling along a hue angle of 90°, a larger $C^*$ value, in this case, can be thought of as more yellow. Thus, for the purposes of this invention, it is desirable to minimize the initial $C^*$ value (less yellow) of the unpainted cover and also inhibit or prevent $C^*$ increase over time, the $C^*$ rate of increase, or preferably both, due to exposure to UV radiation, for example. It is also desirable to maximize the initial $L^*$ (towards white) value and inhibit or prevent its decrease towards black over time due to exposure to UV or other radiation having a similarly disadvantageous effect on the appearance of golf balls.

Preferably, the polyurethane composition of the invention should have an initial $C^*$ value of less than about 5 and an $L^*$ value of greater than about 87, preferably, less than about 4 and an $L^*$ value of greater than about 87. After exposure to QUV for 1 hour, the polyurethane composition of the invention should preferably have a $C^*$ value of less than about 20 and an $L^*$ value of greater than about 86, preferably less than about 15 and an $L^*$ value of greater than about 86. The QUV is a weathering system that contains a UV lamp and is manufactured by Q-Panel of Cleveland, Ohio, and modified to secure golf balls for exposure to UV light as would be recognized by one of ordinary skill in the art. The QUV and UV lamp operate as described by ASTM-G53 (now ASTM-G154).

After exposure to QUV for 2 hours, the polyurethane composition of the invention should preferably have a $C^*$ value of less than about 25 and an $L^*$ value of greater than about 85, preferably less than about 20 and an $L^*$ value of greater than about 85. After exposure to QUV for 4 hours, the polyurethane composition of the invention should preferably have a $C^*$ value of less than about 25 and an $L^*$ value of greater than about 83, preferably less than about 23 and an $L^*$ value of greater than about 83.

The change in the C* and L* values of the polyurethane compositions of the invention, ΔC* and ΔL*, respectively, can also be measured as a function of time. After exposure to QUV for 1 hour, the polyurethane composition of the invention preferably has a ΔL* value of greater than about −4 and an ΔC* value of less than about 22, more preferably less than about 15, and most preferably less than about 12. After exposure to QUV for 2 hours, the polyurethane composition of the invention preferably has a ΔL* value of greater than about −4 and an ΔC* value of less than about 22, more preferably less than about 15, and most preferably, less than about 13. After exposure to QUV for 4 hours, the polyurethane composition of the invention preferably has a ΔL* value of greater than about −7 and an ΔC* value of less than about 26, more preferably less than about 20, and most preferably less than about 18.

In one embodiment, the invention is a multilayer golf ball that includes a core, an inner cover layer, and an outer cover layer. The cover thickness should be at least about 0.02 inches. Preferably, the outer cover layer has a thickness of between about 0.02 and about 0.1 inches, more preferably from about 0.02 to about 0.08 inches. Most preferably, the thickness is from about 0.03 to 0.05 inches.

As discussed herein, the outer cover layer is preferably formed from a relatively soft polyurethane material. In particular, the material of the outer cover layer should have a material hardness, as measured by ASTM D2240-00, of less than about 80 Shore D, preferably less than about 70 Shore D, more preferably less than about 60 Shore D, and most preferably from about 20 Shore C to about 55 Shore D.

The inner cover layer of the present invention, when included, may be formed of any material available to one of ordinary skill in the art, including the polyurethane composition of the present invention, but it is preferably formed from a hard, high flexural modulus, resilient material. Preferably, the material of the inner cover layer has a material hardness, as measured by ASTM D2240-00, of about 20 to about 80 Shore D, more preferably about 40 to about 70 Shore D, and most preferably about 60 Shore D to about 70 Shore D. The thickness of the inner cover layer will typically be less than about 0.1 inches, but preferably ranges from about 0.01 inches to about 0.08 inches, more preferably from about 0.02 inches to about 0.06 inches, and most preferably from about 0.03 to about 0.04 inches.

The optional inner cover layer may be formed from a wide variety of relatively hard (greater than about 60 Shore D), high flexural modulus (greater than about 55,000 psi) resilient materials. Preferably, the optional inner cover layers have a material hardness of at least about 65 Shore D and more preferably, between about 65 to about 75 Shore D.

Among the preferred inner cover materials are hard, high flexural modulus ionomer resins and blends thereof. These ionomers can be obtained by providing a cross metallic bond to polymers of mono-olefin with at least one member selected from the group consisting of unsaturated mono- or di-carboxylic acids having 3 to 12 carbon atoms and esters thereof (the polymer contains about 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0 to about 50 (preferably 0 to about 25, most preferably 0 to about 20), weight percent of the polymer, and Y is acrylic or methacrylic acid present in about 5 to 35 preferably at least about 16, more preferably at least about 16 to 35, most preferably at least about 16 to 20) weight percent of the polymer, wherein the acid moiety is neutralized about 1 to 90% (preferably at least about 40%, most preferably at least about 60%) by a cation such as lithium, sodium, potassium, magnesium, calcium, barium, lead, tin, zinc, or aluminum, or a combination of such cations, to form an ionomer. Exemplary acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers. Such ionomer resins are commercially available, for example, from E.I. DuPont de Nemours and Co. under the tradename SURLYN, and from Exxon under the tradename IOTEK. Some particularly suitable SURLYNS include SURLYN 8140 and SURLYN 8546, each of which has a methacrylic acid content of about 19%.

The materials for the inner cover layer, however, are not limited to ionomer resins. Instead, the present invention contemplates that virtually any relatively hard, high flexural modulus, resilient material known to one of ordinary skill in the art that is compatible with the other materials of the golf ball may be employed as the inner cover layer. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrene-butadiene elastomer, a metallocene polymer, or blends thereof.

Suitable thermoplastic polyetheresters include materials which are commercially available from DuPont under the tradename HYTREL. Suitable thermoplastic polyetheramides include materials which are available from Elf-Atochem under the tradename PEBAX. Other suitable materials for the inner cover layer include polycarbonates, polyimides, nylons, polyamides, polyureas, epoxies, urethane ionomers, acrylonitrile-butadiene-styrene copolymer, polysulfones, and thermoplastic and thermoset polyurethanes, and combinations thereof.

Thread with various material properties, dimensions, cross-sectional shapes, and methods of manufacturing the thread may be used for any wound layer present in the ball. The material properties of the thread that can be varied include ultimate or maximum elongation and tensile modulus. For example, the thread may be formed from fiber, glass, carbon, or a variety of polymeric materials, including the polymer composition of the present invention. Suitable polymers include polyether urea, such as LYCRA, polyester urea, polyester block copolymers, such as HYTREL, isotactic-poly(propylene), polyethylene, polyamide, polyketone, poly(ethylene terephthalate), such as DACRON, poly (p-phenylene terephthalamide), such as KEVLAR, poly (acrylonitrile), such as ORLON, copolymers of diaminodicyclohexylmethane and dodecanedicarboxylic acid, such as QUIANA, all of which are commercially available from DuPont. Other suitable thread materials include cis-polyisoprene rubber, preferably at least about 60% of a blend of two synthetic cis-1,4 polyisoprene rubbers, and about less than 40% of a natural rubber. It is preferred that the synthetic cis-1,4 polyisoprene rubbers have a cis-1,4 content of at least 90%, however, the cis-1,4 contents may vary for each rubber. Preferred threads are elastomeric, while graphite thread tends to be less preferred than other available thread types due to the difficulty in placing such threads under tension when being wound about a center.

In a particularly preferred embodiment of the present invention, the core is a large, solid core, having a compression of less than about 80. A large core, as used herein, is defined as having a diameter of at least about 1.500 inches.

The materials for solid cores include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. If desired, the polybutadiene can also be mixed with other elastomers known in the art such as natural rubber, polyisoprene rubber and/or styrene-butadiene rubber in order to modify the properties of the core.

The crosslinking agent preferably includes a metal salt of an unsaturated fatty acid such as a zinc salt or a magnesium salt of an unsaturated fatty acid having 3 to 8 carbon atoms, such as acrylic or methacrylic acid. Suitable cross linking agents include metal salt diacrylates, dimethacrylates, and monomethacrylates, or a mixture thereof, wherein the metal is, for example, magnesium, calcium, zinc, aluminum, sodium, lithium, or nickel, or a mixture thereof.

The initiator agent can be any known polymerization initiator which decomposes during the cure cycle. Suitable initiators include peroxide compounds, such as dicumyl peroxide, 1,1-di(t-butylperoxy) 3,3,5-trimethyl cyclohexane, a-a'bis(t-butylperoxy)diisopropylbenzene, 2,5-dimethyl-2,5 di(t-butylperoxy)hexane, di-t-butyl peroxide, or mixtures thereof.

The core may include about 5 to 50 pph of ZnO in a diacrylate-peroxide core system. Zinc oxide may be used in combination with, or be replaced by, about 5 to 50 pph of calcium oxide in a diacrylate-peroxide system to provide a suitable core composition.

As used herein, the term "filler" in connection with the core includes any compound or composition that can be used to vary the density and other properties of the core. Fillers typically includes materials such as zinc oxide, barium sulfate, silica, calcium carbonate, zinc carbonate, regrind (recycled core material ground to 30 mesh particle) and the like. Any of the fillers described herein with respect to the cover or intermediate layers are also suitable for use in preparing such solid core formulations.

In one embodiment of the present invention, the core includes a center which is liquid-filled or solid, around which an elastic thread is wound. The solid center is typically a homogenous mass of a resilient material such as polybutadiene or a natural rubber. The liquid-filled center is typically a thin-walled sphere made from a thermoplastic or a thermoset material into which a liquid such as corn syrup is injected by means of a needle. The sphere is then sealed and typically frozen to make the core a solid mass. The windings for either type of center are typically provided by an elastic thread that is stretched and wound about the center and any other intermediate layers to a desired thickness.

The overall outer diameter of the core, including the center and any intermediate mantle layer(s) or windings, together with the inner cover layer of the golf balls of the present invention, is about 1.51 inches to about 1.64 inches, preferably about 1.59 inches to about 1.63 inches, and most preferably from about 1.60 inches to about 1.62 inches.

The present multilayer golf ball can have an overall diameter of any size. Although the United States Golf Association ("USGA") specifications require the minimum size of a competition golf ball to at least 1.680 inches in diameter, there is no specification as to the maximum diameter. Thus, the preferred diameter of the golf ball of the present invention is about 1.680 inches to about 1.800 inches. The more preferred diameter is from about 1.680 inches to about 1.760 inches. The most preferred diameter is about 1.680 inches to about 1.740 inches.

The core and inner cover of the golf balls of the present invention can be made by any conventional process employed in the golf ball art. For example, the solid centers can be either injection or compression molded. Similarly, the wound centers employed in the present invention can be produced through any means. The optional inner cover layer and any mantle layer(s) can then subsequently be injection or compression molded about the core.

The outer cover layer of the present invention may be formed by any process available to those of ordinary skill in the art, such as by injection molding or compression molding. Due to the preferred thinness (preferably less than about 0.05 inches), however, it is difficult to form the outer cover layers of the ball of the present invention using conventional injection or compression molding techniques ordinarily employed in the golf ball art for applying cover materials. These conventional ball molding processes are not capable of easily applying such thin outer cover layers over a solid spherical surface.

Accordingly, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material according to the invention, provide desirable, very thin, outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733,428, filed May 2, 1995, entitled "Method And Apparatus For Forming Polyurethane Cover On A Golf Ball", the disclosure of which is hereby incorporated herein in its entirety by express reference thereto.

The cover is preferably formed around the coated core by mixing and introducing the polyurethane components in each of a pair of mold halves. It is important that the viscosity be measured over time, so that the subsequent steps of filling each mold half, introducing the core into one half and closing the mold can be properly timed for accomplishing centering of the core cover halves fusion and improving overall uniformity and concentricity. A suitable viscosity range of the curing urethane mix for introducing cores into the mold halves is typically about 2,000 cP to about 30,000 cP, with the preferred range of about 8,000 cP to about 15,000 cP.

To start the cover formation, mixing of the prepolymer and curative can be accomplished, typically in motorized mixer including a mixing head, by feeding through lines metered amounts of curative and prepolymer. Top preheated mold halves can be filled and placed in fixture units using pins moving into holes in each mold. After the reacting materials have resided in top mold halves for about 50 to about 80 seconds, a core can be lowered at a controlled speed into the gelling reacting mixture. At a later time, a bottom mold half or a series of bottom mold halves having similar mixture amounts can be introduced into the cavity. In a preferred embodiment, when diols and secondary amines are used as curing agents, the resulting elastomers can further be processed by injection molding.

A ball cup can hold the ball core through reduced hose pressure or even partial vacuum. Upon location of the coated core in the halves of the mold after gelling for about 50 to about 80 seconds, the vacuum can be released to release the core. The mold halves, with core and solidified cover half thereon, can then be removed from the centering fixture unit, inverted and mated with other mold halves which, at an appropriate earlier time, have had a selected quantity of reacting polyurethane prepolymer and curing agent introduced therein to commence gelling. Similarly, U.S. Pat. No. 5,006,297 to Brown et al. and U.S. Pat. No. 5,334,673 to Wu both also each disclose suitable molding techniques that may be utilized to apply the castable reactive liquids employed in the present invention. The disclosures of each these patents are also hereby incorporated herein in their entirety by express reference thereto. It should be understood, however, that the methods of the invention are not limited to the use of the techniques described in these references.

In another embodiment of the present invention, golf equipment and/or components associated with and/or a part of golf equipment comprise the polyurethane composition. Examples of golf equipment include, but are not limited to, golf clubs (i.e., putters, drivers, irons, and wedges) and club attachments, additions, or modifications, such as striking face inserts; golf club components (i.e., shafts, hosels, and grips); golf club vibration damping devices; golf gloves and portions thereof, such as glove liners, securing methods, patches, and reinforcements; golf shoes and associated components (i.e., soles, footbeds and spike socket spines, heel counters, toe "puffs," uppers, midsoles, outsoles, liners, and plastic golf spikes); golf bags and their associated framework, support legs, and stands; and any portion of the above items.

In one particular embodiment of the present invention, the cover comprises the polyurethane composition, polyurethane/polyurea blend, or polyurea and polyurethane ionomer compositions.

The term "about," as used herein in connection with one or more numbers or numerical ranges, should be understood to refer to all such numbers, including all numbers in a range.

As used herein, the term "polyurethane composition" refers to a combination of the reaction product of a prepolymer including at least one polyisocyanate and at least one polyol, and at least one curing agent, in addition to the color stabilizer component.

As used herein, the term "ATTI compression" is defined as the deflection of an object or material relative to the deflection of a calibrated spring, as measured with an Atti Compression Gauge, that is commercially available from Atti Engineering Corp. of Union City, N.J. ATTI compression is typically used to measure the compression of a golf ball. However, when referring to the compression of a core, it is preferred to use a compressive load measurement.

EXAMPLES

The following example is provided for illustrative purposes only and is not to be construed as limiting the scope of the invention in any manner.

Example 1

Comparison of Conventional Polyurethane Golf Ball Covers Versus a Polyurethane Cover Produced According to the Invention Two identically-constructed golf balls were prepared, each including a liquid-filled center, a wound layer, and a polyurethane cover. The first golf ball (Formulation I"), prepared according to the invention, has a cover layer formed of the polyurethane composition of the present invention including a reaction product of 4,4'-diphenylmethane diisocyanate ("MDI"), polytetramethylene ether glycol ("PTMEG"), a mixture of 3,5-dimethylthio-2,4-toluenediamine and 3,5-dimethylthio-2,6-toluenediamine curatives (Ethacure 300), and UV stabilizers TINUVIN 571 and TINUVIN 765. The second golf ball ("Formulation II") has a cover layer formed of a polyurethane composition including a reaction product of 4,4'-diphenylmethane diisocyanate ("MDI"), polytetramethylene ether glycol ("PTMEG"), a mixture of 3,5-dimethylthio-2,4-toluenediamine and 3,5-dimethylthio-2,6-toluenediamine curatives. The golf balls were prepared according to the golf ball formation methods described in U.S. Pat. Nos. 5,733,428 and 5,888,437, which are incorporated in their entirety herein by reference.

TABLE 1

| Materials | Formulations | |
|---|---|---|
| | Formulation I | Formulation II |
| MDI - PTMEG Prepolymer[1] | 1 eq. | 1 eq. |
| ETHACURE 300[2] | 0.95 eq. | 0.95 eq. |
| TINUVIN 571[3] | 4.5 wt. % | — |
| TINUVIN 765[4] | 0.1 wt. % | — |
| Color Dispersion[5] | 3.5% | 3.5% |

[1] an MDI-based PTMEG prepolymer at 6.0% NCO, manufactured by Polyurethane Specialties Corporation of Lyndhurst, NJ.
[2] Isomers of 3,5-dimethylthio-2,4-toluenediamine and 3,5-dimethylthio-2,6-toluenediamine curatives, manufactured by Albemarle Corporation.
[3] 2-(2H-Benzotriazol-2-yl)-4-methyl-6-dodecylphenol.
[4] bis (1,2,2,6,6-pentamethyl-4-piperidinyl) sebacate, bis-(1,2,2,6,6-pentamethyl-4-piperidinyl) sebacate.
[5] A 57% pigment blend in polyether triol, manufactured by Harwick Chemical Manufacturing Corporation of Akron, OH.

The golf balls having covers formed of Formulations I and II, along with commercially available golf balls having conventional polyurethane covers, Callaway Red, Callaway Blue, and the Maxfli Revolution, were exposed to UV light, as described below. Three samples of each ball type were placed under a UV light ("QUV") manufactured by Q-Panel of Cleveland, Ohio, and were exposed as described by ASTM-G53. Colorimeter measurements of the color of the various polyurethane covers were taken prior to exposure to UV radiation and at intervals of 1, 2, and 4 hours. One ball of each type was left unexposed to UV for use as a control. The QUV was initially set to the beginning of a UV-on cycle. The weatherometer was then set to cycle with the following conditions: air temperature of 60° C. with the UV-340a lamps on, controlled at an irradiance power of 1.00 W/m$^2$/nm. The golf balls were removed, as noted above, for observation and colorimeter measurement using a Macbeth 7000A Color-Eye, commercially available from GretagMacbeth of New Windsor, N.Y. The large, 1-inch port was used in specular and UV-included mode. The average of two D65/10° illuminant measurements reported for each ball below in Table 2.

TABLE 2

C* and L* Measurements

| Ball | Initial Color | | 1-hr QUV | | 2-hr QUV | | 4-hr QUV | |
|---|---|---|---|---|---|---|---|---|
| | C* | L* | C* | L* | C* | L* | C* | L* |
| Formulation I | 3.8 | 91.7 | 14.3 | 87.9 | 16.2 | 87.8 | 21.2 | 85.9 |
| Callaway ® Red | 7.7 | 91.3 | 31.9 | 81.7 | 40.5 | 77.9 | 35.3 | 74.8 |
| Formulation II | 5.5 | 91.7 | 35.6 | 84.1 | 38.7 | 81.7 | 42.1 | 75.4 |
| Maxfli ® Revolution | 10.7 | 92.4 | 38.1 | 83.5 | 34.1 | 85.1 | 42.4 | 79.5 |
| Callaway ® Blue | 5.3 | 93.1 | 40.3 | 80.0 | 33.1 | 79.7 | 37.2 | 74.5 |

As discussed above, it is desirable to minimize C* values (less "yellowing") and maximize L* values (more white). Table 1 above clearly shows that the golf ball cover of the present invention, Formulation I, has the lowest measured C* values (initial and final) and the highest measured L* values (final) after exposure to UV radiation. These results indicate that thecolor of the Formulation I polyurethane composition is "whiter" (less yellow/brown) than conventional polyurethane cover compositions.

The difference between conventional polyurethane covers and the polyurethane cover of the present invention is presented in Table 3 below.

TABLE 3

Color Difference v. Formulation I

| Ball | Initial/ Color | | 1-hr QUV | | 2-h QUV | | 4-hr QUV | |
|---|---|---|---|---|---|---|---|---|
| | C* | L* | ΔC* | ΔL* | ΔC* | ΔL* | ΔC* | ΔL* |
| Callaway ® Red | 7.7 | 91.3 | 17.6 | −6.2 | 24.3 | −9.9 | 14.1 | −11.1 |
| Formulation II | 5.5 | 91.7 | 21.3 | −3.8 | 22.5 | −6.1 | 20.9 | −10.5 |
| Maxfli ® Revolution | 10.7 | 92.4 | 23.8 | −4.4 | 17.9 | −2.7 | 21.2 | −6.4 |
| Callaway ® Blue | 5.3 | 93.1 | 26.0 | −7.9 | 16.9 | −8.1 | 16.0 | −11.4 |

Also very important is the relative color when compared to the initial color of the ball. The data in Table 3 are the change in color, as measured at discrete time intervals, compared to the golf ball cover of the invention. Table 3 above clearly demonstrates that the color stabilization provided by the UV absorber and light stabilizer used in Formulation I resulted in surprising and unexpected improvement in color stabilization against UV light.

One of ordinary skill in the art would recognize that it is not only important to have a polyurethane composition that remains similar to the initial color, but one that also had excellent initial color to begin with. The initial C* and L* values, shown in both Tables 2 and 3, demonstrate the improvement shown by the polyurethane cover of the present invention. Another important and desirable aspect in addition to good initial color is color stability as a function of time. One skilled in the art would be aware that a polyurethane composition that had good initial color but quickly darkened and yellowed upon exposure to UV light would be undesirable.

Table 4 below shows that Formulation I of the invention not only has excellent initial color (low C* and high L*), but that it also surprisingly and unexpectedly exhibits color change at a slower rate than other commercially-available polyurethane-covered golf balls.

TABLE 4

Change in Color v. Initial Color

| Ball | Initial Color | | 1-hr QUV | | 2-hr QUV | | 4-hr QUV | |
|---|---|---|---|---|---|---|---|---|
| | C* | L* | ΔC* | ΔL* | ΔC* | ΔL* | ΔC* | ΔL* |
| Formulation I | 3.8 | 91.7 | 10.5 | −3.8 | 12.4 | −3.9 | 17.4 | −5.8 |
| Callaway ® Red | 7.7 | 91.3 | 24.2 | −9.6 | 32.8 | −13.4 | 27.6 | −16.5 |
| Maxfli ® Revolution | 10.7 | 92.4 | 27.4 | −8.9 | 23.4 | −7.3 | 31.7 | −12.9 |
| Formulation II | 5.5 | 90.3 | 30.1 | −6.2 | 33.2 | −8.6 | 36.6 | −14.9 |
| Callaway ® Blue | 5.3 | 93.1 | 35.0 | −13.1 | 27.8 | −13.4 | 31.9 | −18.6 |

A third cover formulation was made and comprises PMS 1088 (MDI/PTMEG 2000 based prepolymer) cured with ETHACURE 300+3.5% HCC-19584 (white dispersion)+ 6.0% GIvsorb UV-1 (UV absorber)+0.1% Tinuvin 765 (HALS) ("Formulation 3").

The QUV was performed per ASTM G 154-00a with the same conditions, sample holders and sample preparation as above. The color was measured as described above except that a ½-inch diameter port was used. UV light was included as above, however the specular component was excluded. The ASTM E 313-73 (D 1925) Yellow Index is reported below. The L*, a*, b*, and ΔE* values reported below are from the CIELAB system. One of ordinary skill in the art would be aware that CIELAB is a different color system and does not contain the chromaticity (C*) and hue (H*) values present in the CIELCh system. In the CIELAB system, the color component is separated into +b* and −b* (yellow and blue, respectively) and +a* and −a* (red and green, respectively).

The various CIELAB color system values were measured for a variety of golf balls and are presented in Table 5 below.

TABLE 5

Initial Color Values

| | Initial | | | |
|---|---|---|---|---|
| Ball | $Y_i$ | L* | a* | b* |
| Formulation 3 | 1.9 | 90.0 | −3.3 | −1.7 |
| Formulation 1 | 3.9 | 90.3 | −4.0 | −0.3 |
| Maxfli Revolution | 25.5 | 92.0 | 1.1 | 9.8 |
| Callaway Red | 18.6 | 90.2 | −1.6 | 6.9 |
| Callaway Blue | 12.5 | 95.3 | −1.8 | 3.5 |
| Formulation 2 | 1.1 | 90.0 | 3.0 | −2.2 |

ΔE* is the total color change
ΔE* = the square root of: $\Delta L^{*2} + \Delta a^{*2} + \Delta b^{*2}$ The CIELAB color system values were then measured at different time intervals and compared to their original values. These data are presented below in Table 6.

TABLE 6

Color Values Change as a Function of Time

| Ball | 1-hr QUV | | | | | 2-hr QUV | | | | | 4-hr QUV | | | | |
|---|---|---|---|---|---|---|---|---|---|---|---|---|---|---|---|
| | ΔY | ΔL* | Δa* | Δb* | ΔE* | ΔY | ΔL* | Δa* | Δb* | ΔE* | ΔY | ΔL* | Δa* | Δb* | ΔE* |
| Formul'n 3 | 24.3 | −3.3 | −1.5 | 14.2 | 14.6 | 32.0 | −4.5 | −1.2 | 18.6 | 19.2 | 41.7 | −6.5 | 0.2 | 23.8 | 24.6 |
| Formul'n 1 | 24.8 | −3.5 | −0.6 | 14.2 | 14.7 | 31.1 | −4.6 | −0.3 | 17.9 | 18.5 | 37.9 | −6.3 | 0.8 | 21.4 | 22.3 |
| Maxfli Revolution | 51.9 | −9.5 | 0.9 | 34.8 | 36.1 | 58.0 | −12.2 | 3.6 | 36.8 | 39.0 | 68.3 | −17.4 | 7.4 | 40.4 | 44.6 |
| Callaway Red | 45.9 | −10.1 | 2.3 | 26.9 | 28.8 | 57.2 | −11.9 | 6.6 | 32.1 | 34.9 | 57.8 | −15.8 | 8.5 | 29.4 | 34.4 |
| Callaway Blue | 49.3 | −10.7 | 2.2 | 30.0 | 31.9 | 60.3 | −13.8 | 5.2 | 30.5 | 33.9 | 60.4 | −17.9 | 8.0 | 31.4 | 37.0 |
| Formul'n 2 | 69.3 | −13.4 | 4.8 | 38.4 | 40.9 | 79.1 | −17.6 | 8.5 | 41.5 | 45.9 | 85.9 | −21.1 | 11.3 | 42.9 | 49.1 |

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those of ordinary skill in the art from the foregoing description. Such modifications are also intended to fall within the scope of the appended claims.

What is claimed is:

1. A golf ball comprising a center, an inner cover layer, and an outer cover layer, wherein the outer cover layer has a color lightness, L*, of 87 or greater following exposure to UV light at an irradiance power of 1.00 W/m²/nm for a period of about 1 hour to about 4 hours, and the cover comprises:
    a polyurea formed from a prepolymer and a curing agent; and
    a blend of color stabilizers consisting of 2-(2H-Benzotriazol-2-yl)-4-methyl-6-dodecylphenol, 3-(2H-Benzotriazol-2-yl)-5-tert-butyl-4-hydroxybenzenepropanoic acid, and 2-[4-((2-Hydroxy-3-dodecyloxypropyl)oxy)-2-hydroxyphenyl]-4,6-bis(2,4-dimethylphenyl)-1,3,5-triazine;
    wherein each of the color stabilizers is present in an amount of 1.0 to 3.0 percent by weight.

2. The golf ball of claim 1, wherein the outer cover layer, after the UV exposure, exhibits a change in the color lightness, ΔL*, of no less than −7 as compared to the cover before the UV exposure.

3. The golf ball of claim 2, wherein the ΔL* is no less than −5.8.

4. The golf ball of claim 2, wherein the ΔL* is no less than −4.

5. The golf ball of claim 1, wherein the outer cover layer has a color saturation, C*, of less than 25 following the UV exposure.

6. The golf ball of claim 5, wherein the color saturation, C*, after the UV exposure, is less than 23.

7. The golf ball of claim 6, wherein the color saturation, C*, after the UV exposure, is less than 20.

8. The golf ball of claim 5, wherein the outer cover layer, before the UV exposure, has an initial C* of less than 5.

9. The golf ball of claim 8, wherein the initial C* is less than 4.

10. The golf ball of claim 8, wherein the outer cover layer exhibits a difference between the color saturation after the UV exposure and the initial C*, before the UV exposure, identified as ΔC*, of less than 22.

11. The golf ball of claim 10, wherein the ΔC* is less than 18.

12. The golf ball of claim 10, wherein the ΔC* is less than 15.

13. The golf ball of claim 5, wherein the outer cover layer, after the UV exposure, has a ratio of C* to L* of less than 0.29.

14. The golf ball of claim 13, wherein the ratio of C* to L* of the outer cover layer, after the UV exposure, is less than 0.25.

15. The golf ball of claim 14, wherein the ratio of C* to L* of the outer cover layer, after the UV exposure, is less than 0.18.

16. The golf ball of claim 5, wherein the outer cover layer, before the UV exposure, has a ratio of C* to L* of less than 0.04.

17. The golf ball of claim 1, wherein the core comprises a center and an outer core layer.

18. A golf ball comprising a center and an outer cover layer, wherein the outer cover layer exhibits a color lightness, L*, of greater than about 86 and a change in the color lightness, ΔL*, of no less than about −4 following exposure to UV light at an irradiance power of 1.00 W/m²/nm for a period of 1 hour, and the outer cover layer comprises:
    a reaction product comprising a prepolymer and a curing agent;
    a blend of UV stabilizers consisting of 2-(2H-Benzotriazol-2-yl)-4-methyl-6-dodecylphenol, 3-(2H-Benzotriazol-2-yl)-5-tert-butyl-4-hydroxybenzenepropanoic acid, and 2-[4-((2-Hydroxy-3-dodecyloxypropyl)oxy)-2-hydroxyphenyl]-4,6-bis(2,4-dimethylphenyl)-1,3,5-triazine, each present in an amount of 1.0% to 3.0% by weight of the reaction product; and
    a light stabilizer present in an amount of 0.05% to 1% by weight of the reaction product.

19. A golf ball comprising a center, a cover, and at least one intermediate layer disposed between the center and the cover, wherein the cover has a ratio of an initial color saturation to an initial color lightness of less than about 0.04, and the cover comprises:
    a reaction product of a prepolymer and a curing agent;
    a blend of UV stabilizers consisting of 2-(2H-Benzotriazol-2-yl)-4-methyl-6-dodecylphenol, 3-(2H-Benzotriazol-2-yl)-5-tert-butyl-4-hydroxybenzenepropanoic acid, and 2-[4-((2-Hydroxy-3-dodecyloxypropyl)oxy)-2-hydroxyphenyl]-4,6-bis(2,4-dimethylphenyl)-1,3,5-triazine, and being present in a first amount; and
    a light stabilizer present in a second amount less than the first amount.

* * * * *